Aug. 7, 1928.
W. H. KEENAN
1,679,667
UNIFORM LOAF MAKING MACHINE
Filed Jan. 11, 1926  2 Sheets-Sheet 2
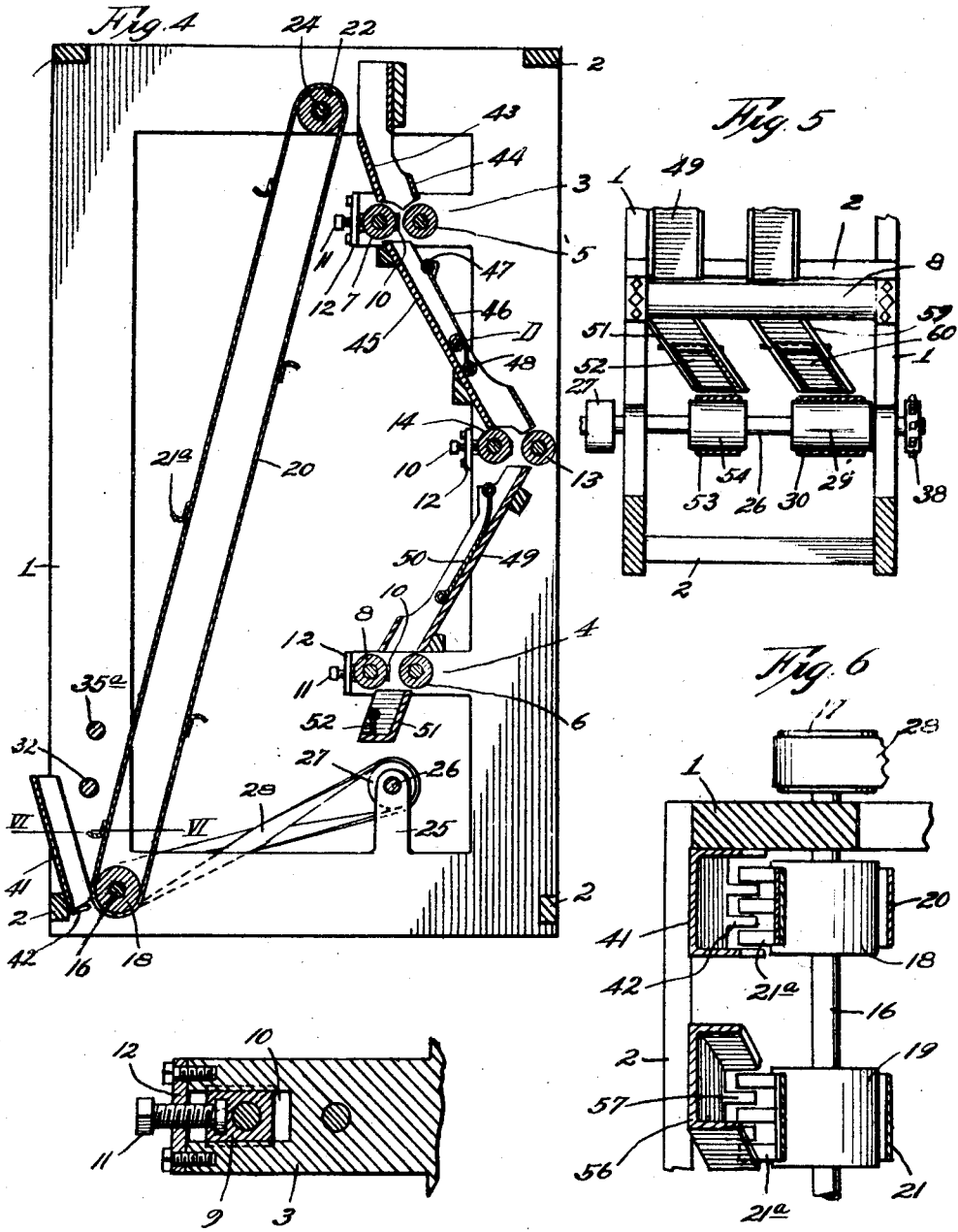

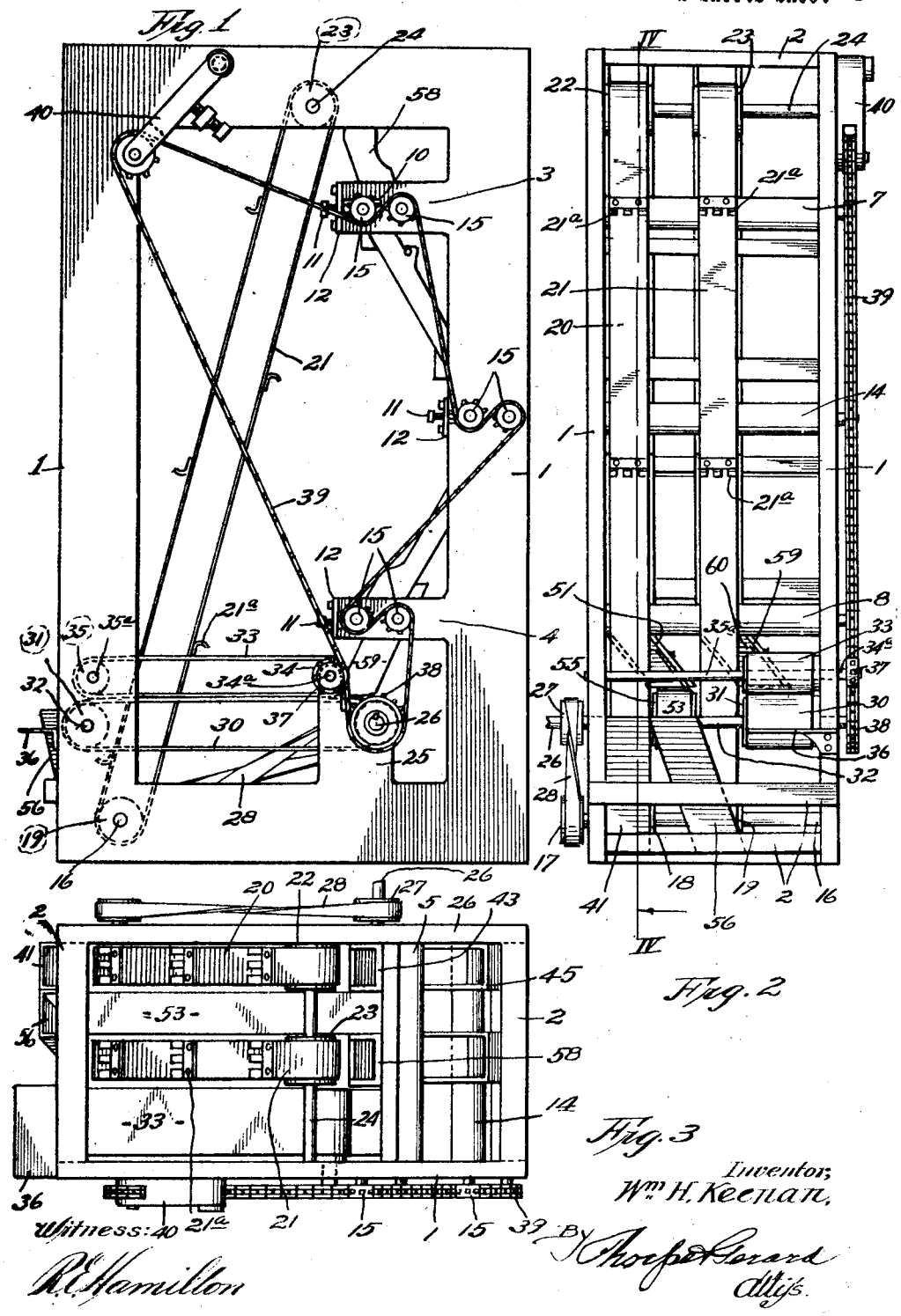

Patented Aug. 7, 1928.

1,679,667

UNITED STATES PATENT OFFICE.

WILLIAM H. KEENAN, OF CHICAGO, ILLINOIS.

UNIFORM-LOAF-MAKING MACHINE.

Application filed January 11, 1926. Serial No. 80,461.

This invention relates to loaf making machines and has for its object to produce an automatic machine for the thorough and uniform development or "breaking" of dough which has preliminarily been divided according to the size of the loaf of bread it is desired to produce, a machine of this character being desirable in small bakeries to insure expeditious production of dough loaves of uniform quality and color, economically and under proper sanitary conditions. In such bakeries it is now standard practice to break or develop a large quantity of dough by feeding and folding it back and forth by hand, through a dough break.

A further object is to produce a machine of the character described which will deliver a completely kneaded and molded loaf ready for the baking pan.

A still further object is to produce a machine of the character outlined which is of strong, durable, efficient, compact, and inexpensive construction, and has no complicated or intricate parts requiring constant attention to keep them in normal working order; and in order that the invention may be fully understood, reference is to be had to the accompanying drawings, in which:—

Figure 1 is a side elevation of a machine embodying the invention.

Figure 2 is a front elevation of the same.

Figure 3 is a top plan view.

Figure 4 is a section on the line IV—IV of Figure 2.

Figure 5 is a broken sectional view to illustrate the apparatus for "balling" or rolling the dough preliminary to its delivery to certain conveyor belts forming a part of the machine.

Figure 6 is an enlarged section on the line VI—VI of Figure 4.

Figure 7 is an enlarged sectional view through a pair of the developing or breaking rollers to illustrate a convenient method of varying the compression.

In the said drawings, where like reference characters identify corresponding parts in all of the figures, 1 indicates a pair of suitable upright rectangular frames held spaced apart in parallel relation by a horizontal cross bar construction 2, and projecting forwardly from the rear uprights of each of the frames 1, are two pairs of brackets 3 and 4. Rotatably mounted between each pair of brackets respectively, and extending transversely of the machine, are fixed compression rollers 5 and 6 (see Figure 4), each of said rollers being respectively adapted to work in conjunction with companion compression rollers 7 and 8 journaled at their opposite ends in similar slide blocks 9 travelling in guides formed by the bifurcated ends 10 of the brackets 3 and 4. Said blocks may be adjusted forwardly or rearwardly to vary the distance between the rollers by means of bolts 11 engaging threaded straps or plates 12 secured to the ends of the brackets, as shown most clearly in Figure 7.

A third pair of compression rollers 13 and 14 are rotatably mounted between the rear uprights of the frames 1, the rollers 13 being adjustably mounted to vary its distance from the rollers 14 in a manner similar in all respects to that described in connection with the rollers 5—7 and 6—8, that is by a bolt 11 and plate 12.

All of said compression rollers at their corresponding ends project through the frame-work of the machine and the projecting ends of each are provided with a toothed driving gear 15 (see Figure 1).

Journaled at its opposite ends in the side frames 1 at the front end of the machine and near the floor is a transverse shaft 16, projecting at one end through the side frame of the machine and equipped at said end with a driving belt pulley 17. The said shaft is provided within the frame-work with a pair of spaced pulleys 18 and 19, for respective driving engagement with a pair of inclined endless belts 20 and 21, equipped with suitable forks or grapples 21ª for elevating the dough, as will hereinafter appear. The belts respectively encircle pulleys 22 and 23 keyed on a transverse shaft 24 carried by the upper part of the framework of the machine.

The base of the machine at its opposite sides is formed with a pair of uprights 25, in which is journaled a transverse drive shaft 26, driven by any suitable source of power. The shaft at one end is equipped with a pulley 27 encircled by a crossed-belt 28 in driving engagement with the pulley 17 for the driving of the elevating belts 20 and 21 above-referred to.

The drive shaft 26 at the end opposite its pulley 27 is equipped within the frame with a keyed pulley 29 (see Figure 5), encircled by a molding belt 30 which also encircles at its front or opposite end a pulley 31 journaled on a transverse shaft 32 mounted in the side frames of the machine. A second belt 33 respectively encircling pulleys 34 and 35 carried by the side frames, the pulley 34 being journaled on a stub shaft 34ᵃ and the pulley 35 on a transverse shaft 35ᵃ, overlies said first belt 30. The dough, as will hereinafter appear, is adapted to pass between said belts 30 and 33, which are differentially driven to effect the rolling or molding of the dough into cylindrical form and the discharging of the same onto a receiving table 36 secured to the front end of the machine. The pulley 34 of the top molding belt is equipped with a gear 37 outside the frame of the machine and in alinement with the gears 15 of the compression rollers.

The drive shaft 26 projects through the machine and is equipped at its end with a driving gear 38. The gears 38, 34, and 15 of the compression rollers, are encircled by a driving sprocket chain 39 held in proper tension by means of any suitable adjustable idler 40. It will be evident that upon the application of power to rotate the shaft 26, the compression rollers and the molding belts will be constantly driven in timed relation, and that the elevating belts will also be operated through the crossed-belt 28 in timed relation with the other parts of the machine.

In the operation of the machine, dough which has been passed through a divider and thereby separated into units and then rolled into cylindrical form, each being just sufficient to form a complete loaf of bread, is fed into a chute 41 carried by the front of the machine in line with the belt 20, and equipped at its bottom with a fork 42 to hold the dough until a grapple 21ᵃ on the belt 20 picks up the loaf from the fork and elevates same to the top of the machine.

The loaf units are thus automatically picked up by subsequent grapples, carried to the top of the machine and discharged into an inclined chute 43 (see Figure 4), having a stop board 44 at its lower end to prevent accidental dislodgement of the dough from the chute. The lower end of the chute is adjacent the first pair of rollers 5 and 7, and the cylindrical roll of dough will fall by gravity between said rollers and will pass therebetween as the rollers rotate toward each other, and be thus flattened out into a sheet.

For the proper development or "breaking" of the dough, it is desirable after each sheeting operation, to roll the dough into cylindrical form. The dough thus discharged from the first pair of rollers is received by an inclined chute 45 (see Figure 4), equipped at any suitable point in its length with suitable retarding means constituting a "baller", which is illustrated as comprising a sheet of canvas 46 normally suspended from a cross bar 47 carried by the sides of the chute 45 and provided at its lower end with a weight 48. The canvas by coming into frictional engagement with the sheeted dough will effect the rolling or balling of said dough into cylindrical form as illustrated at D in Figure 4.

The lower end of the chute 45 discharges the rolled dough between the second pair of rollers 13 and 14, from whence it passes into another chute 49 equipped with a baller 50, corresponding to the baller 46. The chute 49 delivers the balled dough to the third pair of rollers 6 and 8. The rollers 6 and 8 discharge the dough into a short inclined chute 51 equipped with a suitable baller 52 which may be similar to the other ballers as shown, or may be spring-actuated if desired, and the dough is thereby discharged onto a horizontal endless conveyor belt 53 encircling at its opposite ends pulleys 54 and 55, respectively keyed on the transverse drive shaft 26 and journaled on the transverse shaft 32 of the molding belt pulley 31. In this connection, it is to be understood, that if found desirable, the conveyor belt 53, may travel in a suitable trough and be equipped with auxiliary balling means to insure the balling or rolling of the dough before it is discharged by said belt.

The conveyor belt 53 conveys each piece of dough to the front of the machine and discharges it into a downwardly inclined chute 56 equipped at its lower end with a fork 57 corresponding to the fork 42 of the chute 41, from whence it is elevated by the grapples 21ᵃ of the belt 21. The belt 21 discharges the dough into a chute 58, by which it is again delivered to the first set of rollers 5 and 7. The dough then follows through the same process as above described, it being apparent that the dough may be thus fed through any desired number of rollers, each operation being a mere repetition of that first described.

The lowermost pair of rollers 6 and 8 finally discharge the dough into a short chute 59 equipped with a suitable baller 60, similar to the baller 52, if desired, and said chute delivers the dough to the traveling molding belt 30 by which it is carried under the molding belt 33. The molder finally discharges the dough in the shape of a cylinder onto the table 36 ready for the baking pan.

From the above description, it will be apparent that I have produced a machine of the character described which possesses all of the features of advantage set forth as desirable, and while I have described and claimed the preferred embodiment of the invention, I reserve the right to make all changes properly falling within the spirit and scope of the appended claim.

I claim:—

In a dough working machine, a framework, a plurality of driven pressure rollers arranged in horizontally staggered vertical columns, every other pair of rollers being in vertical alinement, chutes connecting each adjacent pair of compression rollers, retards in each of said chutes, means to deliver dough to the first pair of compression rollers, and loaf molding means for receiving the dough from the last pair of compression rollers.

In witness whereof I hereunto affix my signature.

WILLIAM H. KEENAN.